(12) United States Patent
He et al.

(10) Patent No.: US 12,468,309 B2
(45) Date of Patent: Nov. 11, 2025

(54) METHOD AND SYSTEM FOR HOVERING CONTROL OF UNMANNED AERIAL VEHICLE IN TUNNEL

(71) Applicant: TONGJI UNIVERSITY, Shanghai (CN)

(72) Inventors: Bin He, Shanghai (CN); Gang Li, Shanghai (CN); Runjie Shen, Shanghai (CN); Jie Chen, Shanghai (CN); Zhipeng Wang, Shanghai (CN); Ping Lu, Shanghai (CN); Yimin Lou, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 814 days.

(21) Appl. No.: 17/657,753

(22) Filed: Apr. 2, 2022

(65) Prior Publication Data
US 2022/0326720 A1    Oct. 13, 2022

(30) Foreign Application Priority Data
Apr. 7, 2021    (CN) .......................... 202110372166.6

(51) Int. Cl.
G05D 1/00     (2024.01)
B64U 10/13    (2023.01)
(Continued)

(52) U.S. Cl.
CPC ............ *G05D 1/0808* (2013.01); *G01S 17/08* (2013.01); *G01S 17/933* (2013.01); *G05D 1/046* (2013.01);
(Continued)

(58) Field of Classification Search
CPC ...... G05D 1/0808; G05D 1/046; G05D 1/106; G05D 1/102; G01S 17/08; G01S 17/933
See application file for complete search history.

(56) References Cited

U.S. PATENT DOCUMENTS

2011/0049290 A1* 3/2011 Seydoux ............... A63H 27/12
                                                              348/114
2011/0311099 A1* 12/2011 Derbanne ............... G06T 7/207
                                                              382/103
(Continued)

FOREIGN PATENT DOCUMENTS

CN    109084735 A    12/2018
CN    111731474 A    10/2020
CN    112130579 A    12/2020

OTHER PUBLICATIONS

Wu, Hao, The Research and Implementation on Autonomous Hovering of Micro Quadrotor Aircraft, Chinese Doctoral Dissertations & Master's Theses Full-text Database(Master) Engineering Science and Technology, 2020, 23 pages.

(Continued)

*Primary Examiner* — Erin D Bishop
*Assistant Examiner* — Mahmoud M Kazimi
(74) *Attorney, Agent, or Firm* — PORUS IP LLC

(57) ABSTRACT

The embodiment of this present disclosure provides a control method of unmanned aerial vehicle (UAV) hovering in tunnel, which comprises the following steps: acquiring hovering information of hovering position of UAV; acquiring the position information of the current position of the UAV; determining flight parameters based on hovering information and position information. The flight parameters are used to control the UAV to move from the current position to the hovering position.

16 Claims, 9 Drawing Sheets

(51) Int. Cl.
*G01S 17/08* (2006.01)
*G01S 17/933* (2020.01)
(52) U.S. Cl.
CPC ............ *G05D 1/106* (2019.05); *B64U 10/13* (2023.01); *B64U 2201/10* (2023.01)

(56) References Cited

U.S. PATENT DOCUMENTS

2017/0308099 A1    10/2017  Kim et al.
2021/0163133 A1*    6/2021  Tao ........................ B64U 10/13
2021/0241635 A1*    8/2021  Tribou .................... B64U 10/60
2023/0409031 A1*   12/2023  Duan ...................... G05D 1/101

OTHER PUBLICATIONS

Zhou, Nianrong et al., Relative Height Measurement Method Based on information Fusion of Accelerometer and Barometer, Yunnan Electric Power, 47(6): 88-92, 2019.
First Office Action in Chinese Application No. 202110372166.6 mailed on Jan. 26, 2022, 17 pages.

* cited by examiner

METHOD AND SYSTEM FOR HOVERING CONTROL OF UNMANNED AERIAL VEHICLE IN TUNNEL

CROSS-REFERENCE TO RELATED APPLICATIONS

This application claims priority to Chinese Patent Application No. 202110372166.6, filed on Apr. 7, 2021, the contents of which are hereby incorporated by reference.

TECHNICAL FIELD

This present disclosure relates to the field of Unmanned Aerial Vehicle (UAV) positioning, and in particular to a control method and system of UAV tunnel hovering.

BACKGROUND

In general, unmanned Aerial Vehicle (UAV) hovering adopts the combined navigation method of GPS+ barometer+Inertial measurement unit (IMU). GPS and barometer could determine the horizontal position and altitude of UAV, and IMU could identify its own flight status and relative displacement, so as to pinpoint a horizontal position and an altitude.

The tunnel, as a water pipeline in large-scale water conservancy projects, has a large cross-sectional area and long, and is the internally dark and humid generally, so it is impossible to install sensors or indoor positioning devices, and no GPS signals and geomagnetic signals needed by unmanned aerial vehicles to hover in the tunnel are available.

Because there is no GPS signal in the tunnel, it is impossible to use the integrated navigation method of GPS+ barometer +IMU to realize the hovering of unmanned aerial vehicle in the tunnel. However, the general indoor navigation technology needs to build additional communication base stations. However, it takes a long time to arrange additional base stations in the tunnel, which leads to a large amount of work and high costs, so it is difficult to realize. Meanwhile, the upper and lower surfaces of the tunnel may not be flat, and the distance measurement in the horizontal direction is affected by the shape of the tunnel. In addition, optical flow sensors are also used in the absolute positioning of unmanned aerial vehicle (UAV), and hovering control is carried out by vision. However, due to the special environment in the tunnel, almost no light, complicated bottom environment and unstable water flow, it is impossible to locate UAV through optical flow module. Therefore, there is a need for an unmanned aerial vehicle hovering method that can be applied to tunnels.

SUMMARY

One or more embodiments of this present disclosure provide a method of hovering control of Unmanned Aerial Vehicle (UAV) in a tunnel, which includes: acquiring hovering information of a hovering position of the UAV; acquiring position information of a current position of the UAV; determining flight parameters based on the hovering information and the position information, wherein the flight parameters are used to control the UAV to move from the current position to the hovering position.

One or more embodiments of this present disclosure provide a system for hovering control of a UAV in a tunnel, which comprises at least one storage medium including a set of instructions, at least one processor in communication with the at least one storage medium, wherein when executing the instructions, the at least one processor is configured to direct the system to perform operations including: acquiring hovering information of a hovering position of the UAV; acquiring position information of a current position of the UAV; and determining flight parameters based on the hovering information and the position information, wherein the flight parameters are used to control the UAV to move from the current position to the hovering position.

A computer-readable storage medium stores computer instructions, and when reading the computer instructions in the storage medium, the computer executes the method of hovering control of UAV in a tunnel.

BRIEF DESCRIPTION OF THE DRAWINGS

This present disclosure will be further explained by way of exemplary embodiments, which will be described in detail by the accompanying drawings. These examples are not limiting, and in these examples, same numerals refer to same structures, in which.

DETAILED DESCRIPTION OF THE EMBODIMENTS

Figure 1:
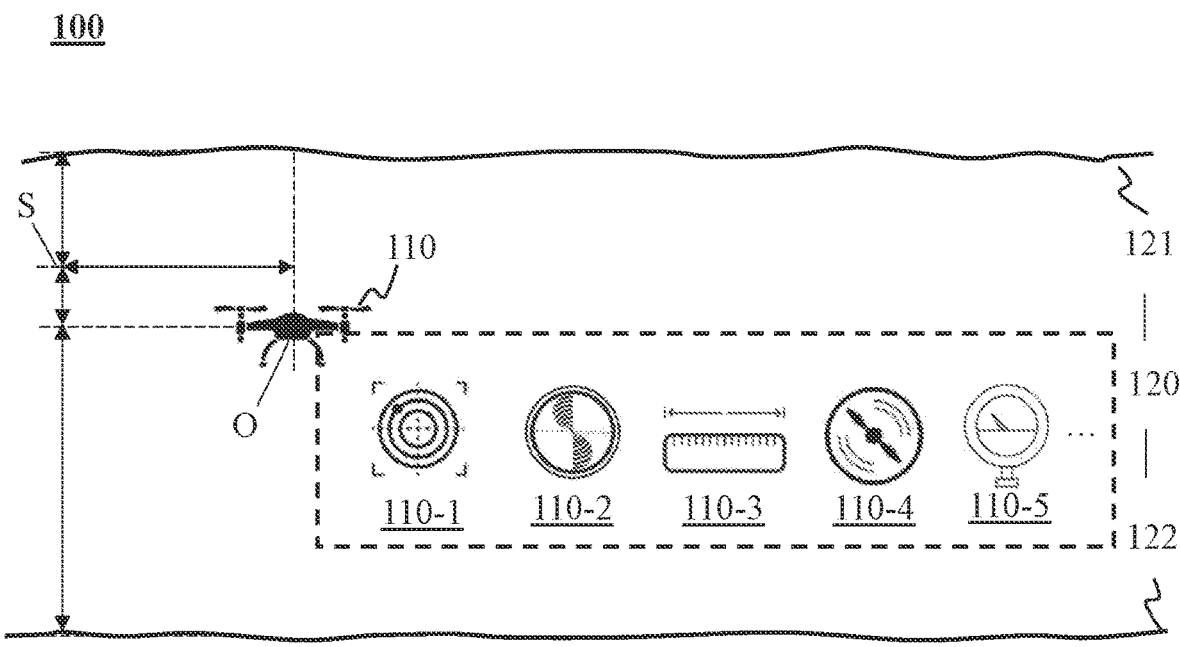
FIG. 1 is a schematic diagram of the application scenario of an Unmanned Aerial Vehicle (UAV) hovering control system in tunnel according to some embodiments of this present disclosure.

In order to more clearly explain the technical scheme of the embodiment of this present disclosure, the following will briefly introduce the drawings needed in the description of the embodiment. Obviously, the drawings in the following description are only some examples or embodiments of this present disclosure. For ordinary technicians in this field, this present disclosure can also be applied to other similar situations according to these drawings without creative efforts. Unless it is obvious from the language environment or otherwise explained, the same reference numerals in the figures represent the same structure or operation.

It should be understood that "system", "device", "unit" and/or "module" as used herein is a method for distinguishing different components, elements, parts, faction or assemblies at different levels. However, if other words can achieve the same purpose, they can be replaced by other expressions.

As shown in this present disclosure and claims, unless the context clearly indicates an exception, the words "a", "an", "an" and/or "the" are not singular, but also plural. Generally speaking, the terms "including" and "containing" only imply the inclusion of clearly identified steps and elements, which do not constitute an exclusive list, and the method or equipment may also contain other steps or elements.

Flowcharts are used in this present disclosure to illustrate the operations performed by the system according to the embodiments of this present disclosure. It should be understood that the preceding or following operations are not necessarily performed exactly in sequence. Instead, the steps can be processed in reverse order or simultaneously. At the same time, other operations may also be added to these processes, or one or more operations may be removed from these processes.

FIG. 1 is a schematic diagram of the application scenario of the Unmanned Aerial Vehicle (UAV) hovering control system in tunnel according to some embodiments of this present disclosure.

The application scenario 100 of the hovering control system (also referred to as system for hovering control of UAV) includes an UAV 110 and a tunnel 120. In some embodiments, the UAV 110 includes a controller 110-1, a lidar 110-2, a laser ranging sensor 110-3, an IMU110-4 and a barometer 110-5. In some embodiments, the tunnel 120 includes a tunnel top 121 and a tunnel bottom 122.

The UAV 110 is an unmanned aerial vehicle, which is operated by a radio remote control device and a self-provided program control device. UAV 110 includes unmanned fixed-wing aircraft, unmanned vertical take-off and landing aircraft, unmanned airships, unmanned helicopters, multi-rotor unmanned aerial vehicles, unmanned paragliders, etc. The type of UAV 110 that performs tasks in the tunnel 120 may be a multi-rotor UAV.

The controller 110-1 is used to control the flight parameters and track the flight state of the UAV 110. For example, the controller 110-1 can control the UAV 110 in many aspects, such as attitude tracking, velocity tracking, fixed-point tracking, path tracking and trajectory tracking. In some embodiments, the controller 110-1 can control by adjusting the flight parameters of the UAV 110 such as attitude and throttle.

Lidar 110-2 and laser ranging sensor 110-3 can be used to measure the distance between target positions. In some embodiments, the lidar 110-2 includes a horizontal lidar for measuring the horizontal velocity and horizontal distance of the UAV 110. In some embodiments, the laser ranging sensor 110-3 includes a to-ground laser ranging sensor and a to-air laser ranging sensor. For example, the laser ranging sensor 110-3 of the UAV 110 can measure the distance of the UAV 110 body relative to the top of the tunnel, the bottom of the tunnel and horizontal obstacles.

IMU 110-4 is an inertial measurement unit, which is a device for measuring the three-axis attitude angle (or angular rate) and acceleration of an object. In some embodiments, based on the measurement data of IMU110-4, further mathematical calculation (for example, integral operation) can be performed to determine the velocity, moving distance, etc., and the attitude of the moving object can also be determined. For example, the IMU110-4 of the UAV 110 can measure the real-time acceleration, real-time angular velocity, horizontal velocity, vertical velocity, horizontal movement distance, movement distance and attitude in the vertical direction of the UAV 110 flying in the tunnel.

The barometer 110-5 is used to measure the vertical altitude data of the UAV 110. For example, the barometer 110-5 can obtain the vertical altitude (or altitude, absolute altitude, etc.) of the UAV 110 when UAV is hovering. In some embodiments, the movement distance of the UAV 110 in the vertical direction can be obtained by calculation.

In some embodiments, if the current position of the UAV 110 in the tunnel is denoted by 0, the UAV 110 can move to the hovering position S through the cooperation of the controller 110-1, the lidar110-2, the laser ranging sensor 110-3 (for example, the to-ground laser ranging sensor and the to-air laser ranging sensor), the IMU110-4 and the barometer 110-5.

For example, lidar 110-2 obtains the measurement data of UAV 110 in the horizontal direction, and the measurement data of lidar 110-2 and IMU110-4 can be fused to obtain the horizontal position and horizontal velocity. For example, in the laser ranging sensor 110-3, the measurement data of the to-ground laser ranging sensor and the to-air laser ranging sensor are combined with the measurement data of the barometer 110-5 to obtain vertical direction data. For example, the controller 110-1 can determine flight parameters based on the measurement data and its calculation results to control the UAV 110 to move from the current position 0 to the hovering position S.

In some embodiments, the controller 110-1 of the UAV 110 may be arranged independently from a processor (not shown), or be integrated into the processor, used as a part of the processor. In some embodiment, the processor may include an acquisition module and a control module. In some embodiments, the acquisition module is used to acquire the hovering information of the hovering position S of the UAV 110 and the position information of the current position 0 of the UAV 110. In some embodiments, the control module is used to determine flight parameters based on hovering information of the hovering position S and position information of the current position 0, which are used to control the UAV to move from the current position to the hovering position. In some embodiments, the processor may also include other modules. For details, see the descriptions in FIG. 3 to FIG. 6 of the present disclosure.

It should be noted that the above description of the system and its modules is for the convenience of description only, and this present disclosure cannot be limited to the scope of the cited embodiments. It can be understood that for those skilled in the art, after understanding the principle of this system, it is possible to arbitrarily combine various modules or form subsystems to connect with other modules without deviating from this principle. In some embodiments, the acquisition module and the control module disclosed in FIG. 1 can be different modules in one system, or one module can realize the functions of the above two or more modules. For example, each module can share a storing module, and each module can also have its own storing module. Such deformation is within the scope of protection of this present disclosure.

Figure 2:
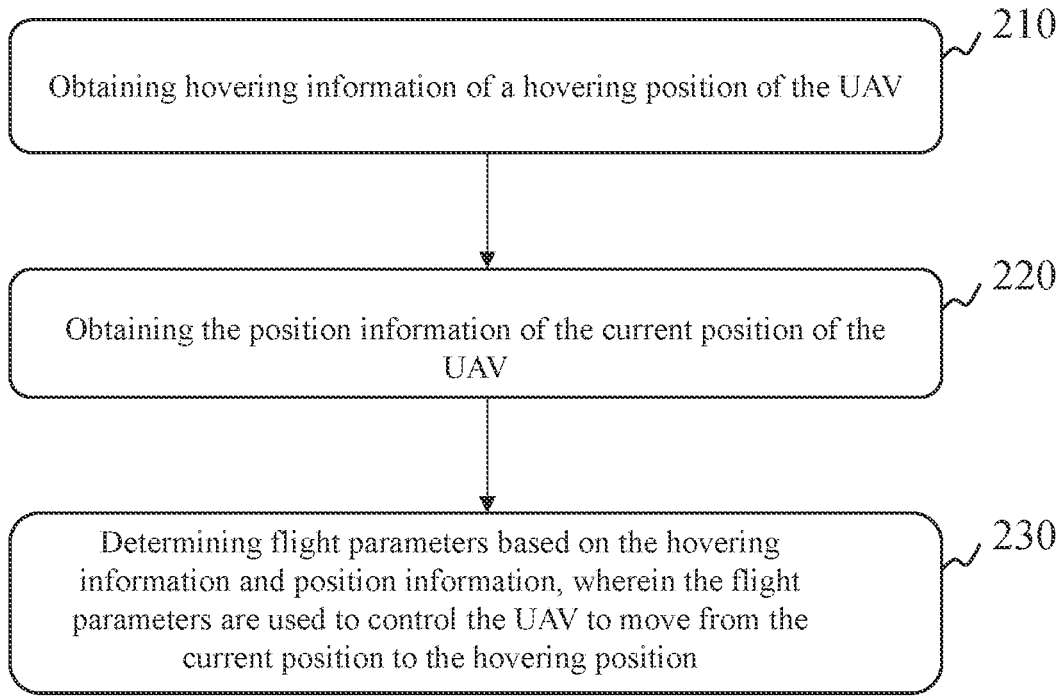
FIG. 2 is an exemplary flow chart of an UAV hovering control method in tunnel according to some embodiments of this present disclosure.

FIG. 2 is an exemplary flow chart of the UAV hovering control method in tunnel according to some embodiments of this present disclosure. As shown in FIG. 2, the process 200 includes the following steps. In some embodiments, the process 200 may be implemented as a set of instructions (e.g., an application) stored in a storage device. In some embodiments, the processor and/or one or more modules may execute the set of instructions and may accordingly be directed to perform the process 200. The operation of the illustrated process presented below is intended to be illustrative. In some embodiments, the steps in the flowcharts of this present disclosure may be performed using one or more additional operations not described and/or one or more operations not discussed. For example, the order of steps of process 200 shown in FIG. 2 and what is described below do not limit the scope of this present disclosure.

210, Obtaining hovering information of a hovering position of the UAV. In some embodiments, 210 is performed by the acquisition module.

A hovering position refers to a certain position when the UAV is suspended and relatively stationary. For example, the hovering position can be the position of the UAV where the UAV is suspended and its spatial coordinate position is unchanged relative to the tunnel wall, the top of the tunnel, the bottom of the tunnel or other reference objects in the tunnel.

Hovering information is position-related information when the UAV is in a hovering position, including the hovering horizontal position and hovering height.

In some embodiments, the hovering information can also be preset by the controller of the UAV, automatically identified and generated, or obtained in other feasible ways.

220, Obtaining the position information of the current position of the UAV. In some embodiments, 220 is performed by the acquisition module.

The current position of the UAV refers to the position of the UAV at the current time. In some embodiments of this present disclosure, the current position of the UAV may also be called the real-time position.

The current position of the UAV is characterized by the position information corresponding to the current position. In some embodiments, the position information of the current position may include the current horizontal position and vertical altitude of the UAV.

In some embodiments, the position information of the current position of the UAV can be obtained from the measurement data acquired by the horizontal lidar, laser ranging sensor, IMU, barometer and other devices on the UAV.

230, Determining flight parameters based on hovering information and position information. In some embodiments, 230 is performed by the control module.

The flight parameters may be correlation coefficients for controlling the flight state of the UAV body. For example, the flight parameters may include the attitude signal (the first flight parameter) and the throttle signal (the second flight parameter) of the UAV.

In some embodiments, the control module can determine the flight parameters based on the hovering information and the position information of the current position. For example, the control module determines the flight parameters of the UAV by PID control based on the hovering information of the UAV, the position information of the current position of the UAV and other relevant information. See the description of the corresponding parts in FIG. 8 and FIG. 9 for the details of determining flight parameters.

PID control is a closed-loop control (feedback control) method, which is based on the combination of P control, I control and D control. PID control is based on the result of addition of three algorithms (proportion, integration, and differentiation) as the output, and its input is an error value (the result of subtracting the measured value from the set value) or the signal derived from the error value.

In some embodiments, the control module can also determine the flight parameters of the UAV by PID control. PID cascade control is two PIDs connected in series, which includes inner loop control and outer loop control. Among them, the change of the outer loop control may directly lead to the change of the inner loop control, and the inner loop control can directly control the change of the actuator.

In some embodiments, the PID cascade outer loop control is a vertical altitude loop, and the target vertical velocity is obtained according to the hovering height and the vertical altitude. In some embodiments, the PID cascade inner loop control is a velocity loop, and the throttle signal is obtained according to the target vertical velocity and vertical velocity. For example, if the height difference of the UAV is large at the beginning, the calculated value of PID may be larger, so the initial velocity may be larger. As the UAV gets closer to the desired position, the deviation will be smaller and smaller, and the output of PID may gradually decrease, so the velocity may gradually decrease.

In some embodiments of this present disclosure, the flight parameters are determined by acquiring hovering information and position information, and based on the flight parameters, the movement state of the UAV can be effectively controlled, which is beneficial to smoothly reach the hovering position and maintain a stable hovering state. PID cascade control enhances the anti-interference performance of the system through the aforementioned inner and outer loop control, improves the accuracy and stability of the control, and is conducive to the efficient and accurate control of the flight state of the UAV.

The present disclosure will be described in detail below with reference to FIG. 3 to FIG. 6 and specific examples. The embodiment is implemented on the premise of the technical scheme of the invention, and detailed implementation and specific operation process are given, but the protection scope of the invention is not limited to the following embodiments.

EXAMPLE 1

A method for multi-rotor UAV hovering in tunnel is provided. The multi-rotor UAV includes the UAV body, the controller, the horizontal lidar, the to-ground laser ranging sensor, the to-air laser ranging sensor, the IMU and the barometer.

Figure 3:
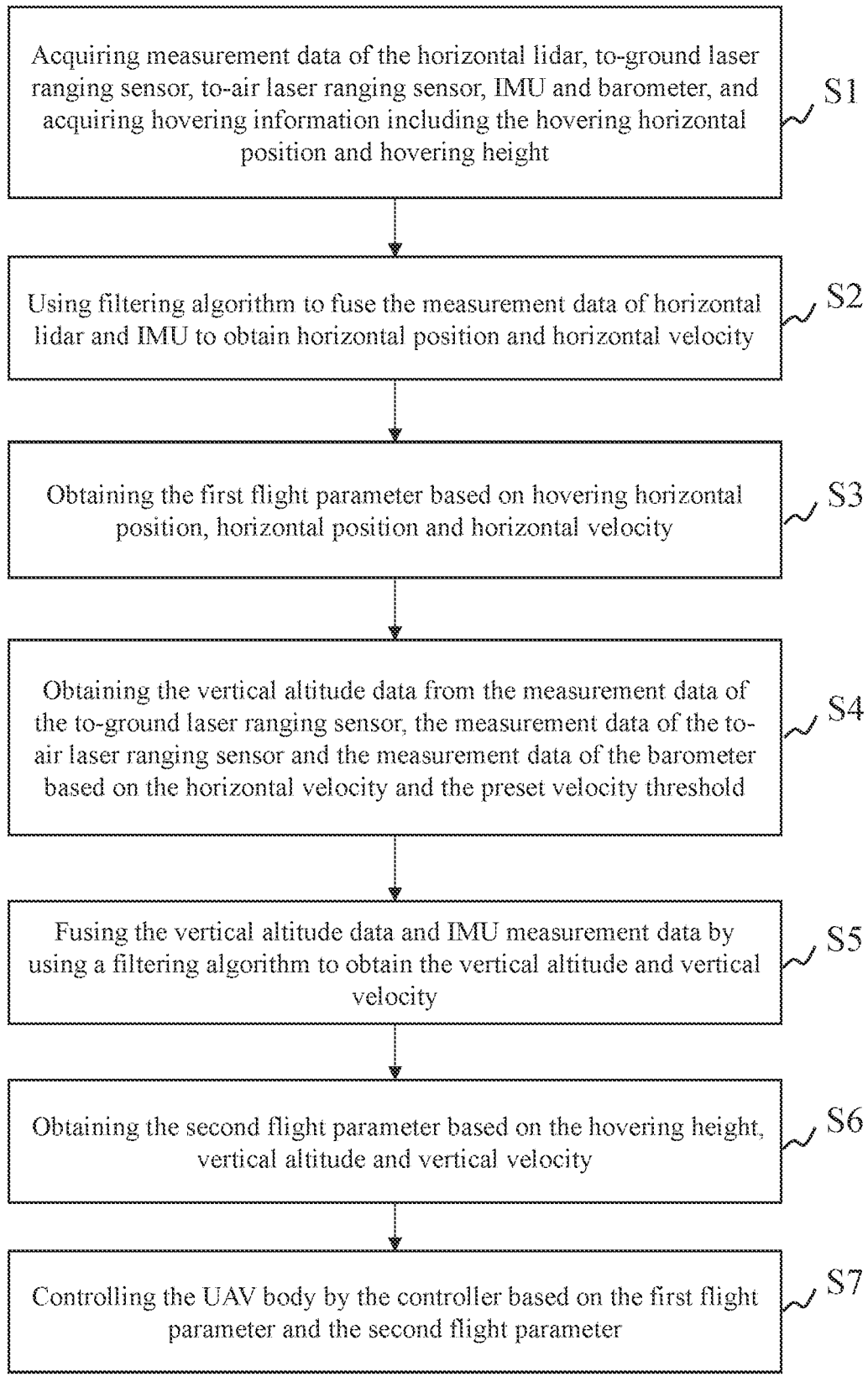
FIG. 3 is an exemplary flowchart of a hovering method according to some embodiments of this present disclosure.

The environment in the tunnel is complex and special, which can't receive GPS, GNSS signals and geomagnetic signals. The light inside the tunnel is extremely poor, and the traditional vision sensor can't work effectively. Therefore, the conventional UAV hovering method can't work on the UAV in the tunnel. In some embodiments of this present disclosure, 360-degree lidar, to-ground single-point laser rangefinder, to-air single-point laser rangefinder, IMU and barometer are horizontally installed on the UAV body, and the hovering of multi-rotor UAV is realized by these sensors. As shown in FIG. 3, the hovering method includes the following steps:

S1, Acquiring measurement data of the horizontal lidar, to-ground laser ranging sensor, to-air laser ranging sensor, IMU and barometer, and acquiring hovering information including the hovering horizontal position and hovering height.

The hovering task of multi-rotor UAV is hovering at hovering horizontal position and hovering height. In some embodiments of this present disclosure, the hovering task is divided into a horizontal positioning task and vertical altitude pinpointing task, and the horizontal positioning task and vertical altitude pinpointing task are carried out respectively to improve the hovering control accuracy. The horizontal positioning task is carried out according to S2 to S3, and the vertical altitude pinpointing task is carried out according to S4 to S6.

Horizontal Positioning Task:

S2 to S3, Using the filtering algorithm to fuse the measurement data of horizontal lidar and IMU to obtain horizontal position and horizontal velocity, and obtaining the first flight parameter based on the hovering horizontal position, horizontal position and horizontal velocity.

Specifically, the filtering algorithm is extended Kalman filtering algorithm. The first flight parameter is obtained by PID cascade control based on hovering horizontal position, horizontal position and horizontal velocity. PID cascade control includes outer loop control and inner loop control. The outer loop control is a horizontal position loop, the target horizontal velocity is obtained according to hovering horizontal position and horizontal position, and the inner loop control is velocity loop. The first flight parameter is obtained according to the target horizontal velocity and horizontal velocity. The first flight parameter is the attitude signal of the UAV body. The flight control of UAV by attitude signal is an existing technology, and flight control is a common technical means in this field, so it will not be repeated here.

Figure 4:
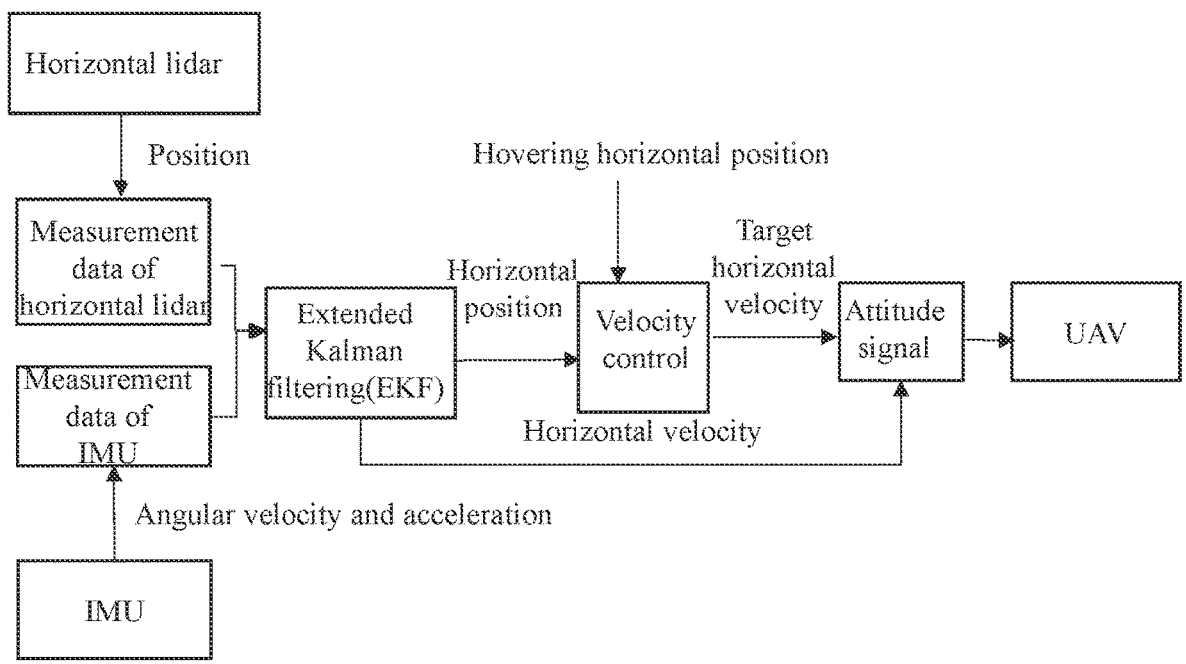
FIG. 4 is an exemplary block diagram of a horizontal positioning task according to some embodiments of this present disclosure.

As the block diagram of the horizontal positioning task shown in FIG. 4. The position information of obstacles in the horizontal direction is obtained by the horizontal lidar, and the high-precision horizontal position and horizontal velocity can be obtained by fusing the measured data of the horizontal lidar with the measured data of IMU through the extended Kalman filtering. Combined with the hovering horizontal position, the high-precision horizontal positioning with high anti-interference ability can be realized by PID cascade control.

Vertical Altitude Pinpointing Task:

S4, Obtaining the vertical altitude data from the measurement data of the to-ground laser ranging sensor, the measurement data of the to-air laser ranging sensor and the measurement data of the barometer based on the horizontal velocity and the preset velocity threshold.

Figure 5:
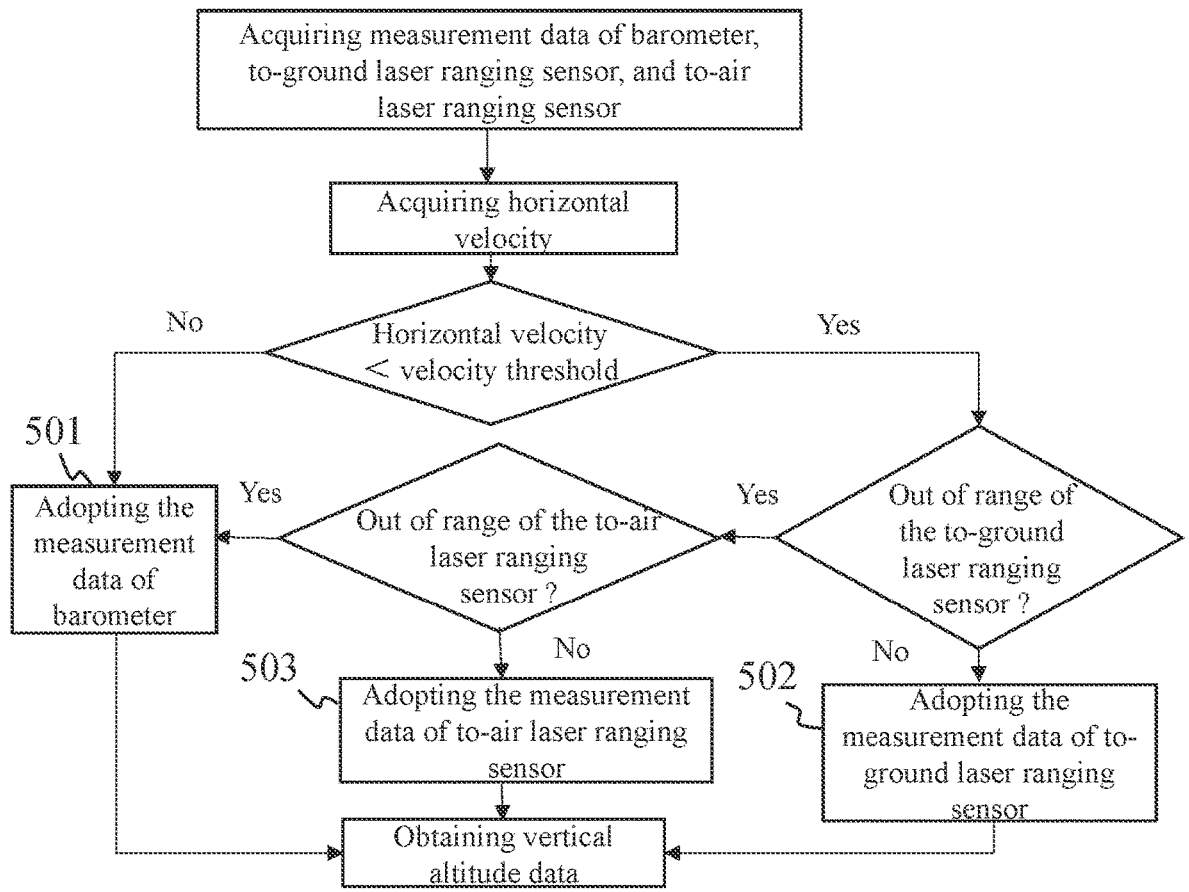
FIG. 5 is an exemplary flowchart of vertical altitude data selection according to some embodiments of this present disclosure.

When the vertical altitude data is determined, IMU is not disturbed by the external environment, but it can only measure the acceleration and angular velocity of the UAV, and estimate the velocity and height of the UAV through integration, but can't directly measure the height, so the accuracy is poor and it is easily affected by sensor drift and error accumulation. The frequency of the barometer is low, and the height calculation will be affected by the ambient temperature. At the same time, the unstable air flow may also have a great impact on the barometer reading. In the tunnel, the structure may be complicated and the air flow is turbulent, which may affect the accuracy of the barometer. The accuracy and frequency of to-ground laser ranging sensors and to-air laser ranging sensors are higher, but they are greatly influenced by the terrain and surface type. Therefore, in order to obtain reliable vertical altitude data as much as possible, velocity threshold is set in some embodiments of this present disclosure, and the flow chart of vertical altitude data selection is shown in FIG. 5.

If the horizontal velocity is greater than or equal to the preset velocity threshold, the vertical altitude data is obtained based on the measurement data of the barometer (501).

If the horizontal velocity is less than the preset velocity threshold and the tunnel ground is within the measurement range of the to-ground laser ranging sensor, the vertical altitude data is obtained based on the measurement data of the to-ground laser ranging sensor (502).

If the horizontal velocity is less than the preset velocity threshold, the tunnel ground is not within the measurement range of the to-ground laser ranging sensor, and the tunnel top is within the measurement range of the to-air laser ranging sensor, the vertical altitude data is obtained based on the measurement data of the to-air laser ranging sensor (503).

If the horizontal velocity is less than the preset velocity threshold, and the tunnel ground and tunnel top are not within the measurement range of the to-ground laser ranging sensor and the to-air laser ranging sensor, respectively, the vertical altitude data is obtained based on the measured data of the barometer (501). In some embodiments, when the horizontal velocity is too high, the high-velocity airflow affects the measurement accuracy of the barometer. Therefore, the to-ground laser ranging sensor is preferred. When the tunnel ground is out of range of the to-ground laser ranging sensor, the to-air laser ranging sensor is used again, and if the tunnel top is out of the range of the to-air laser ranging sensor, the barometer is used again. The velocity threshold can be set according to actual engineering experience, so that the obtained vertical altitude data is more reliable.

S5 to S6, Fusing the vertical altitude data and IMU measurement data by using the filtering algorithm to obtain the vertical altitude and vertical velocity, and obtaining the second flight parameter based on the hovering height, vertical altitude and vertical velocity.

Specifically, the filtering algorithm is extended Kalman filtering algorithm, and the second flight parameter is obtained by PID cascade control based on hovering height, vertical altitude and vertical velocity. PID cascade control includes outer loop control and inner loop control, the outer loop control is vertical altitude loop, the target vertical velocity is obtained according to hovering height and vertical altitude, the inner loop control is velocity loop, the second flight parameter is obtained according to the target vertical velocity and vertical velocity, and the second flight parameter is throttle signal.

Figure 6:
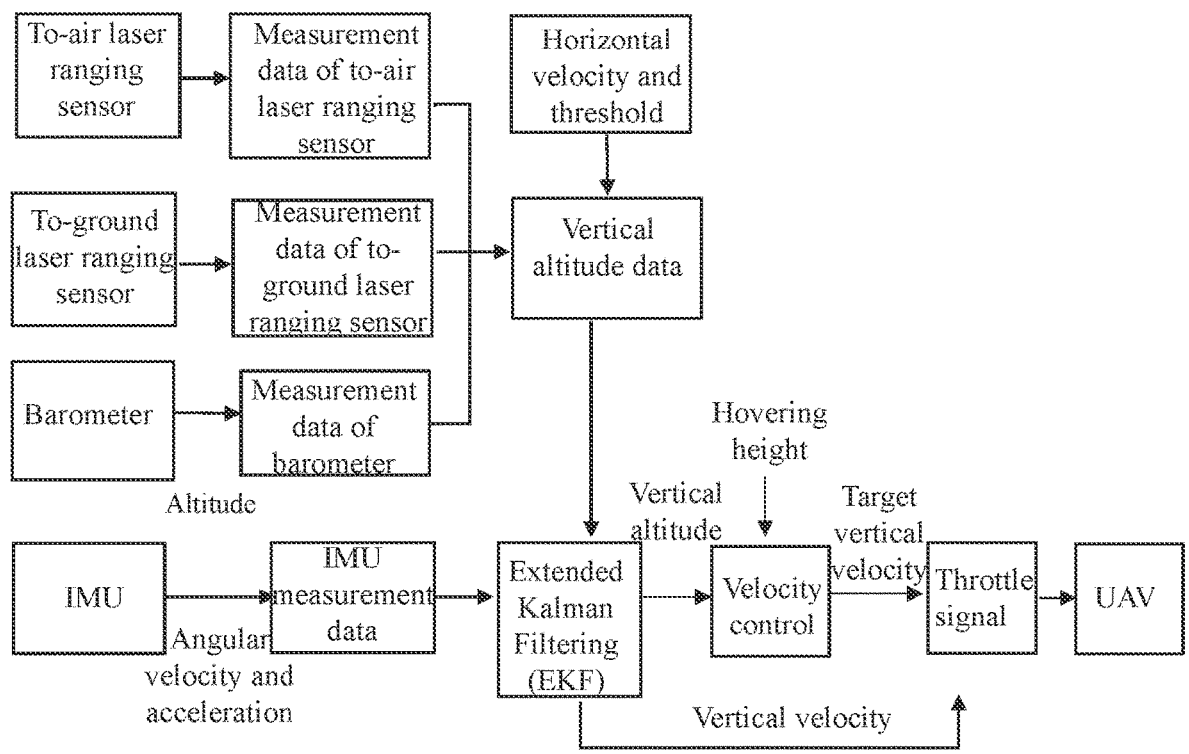
FIG. 6 is an exemplary block diagram of a vertical altitude determination task according to some embodiments of this present disclosure.

As the block diagram of the vertical altitude pinpointing task shown in FIG. 6. Firstly, reliable vertical altitude data is selected, and the vertical altitude data and IMU measurement data are fused by extended Kalman filtering, so that the accurate vertical altitude and vertical velocity of UAV can be obtained. Combined with the hovering height, high-precision vertical altitude control of multi-rotor UAV can be realized by PID cascade control.

S7, Controlling the UAV body by the controller based on the first flight parameter and the second flight parameter.

A system of multi-rotor UAV hovering in tunnel includes a sensor module, a horizontal positioning module, a vertical altitude pinpointing module and a control module. The sensor module includes the horizontal lidar, the to-ground laser ranging sensor, the to-air laser ranging sensor, the IMU and the barometer.

The control module acquires hovering information of the UAV, which includes hovering horizontal position and hovering height.

The control module acquires the measurement data of the horizontal lidar and IMU and sends it to the horizontal positioning module. The horizontal positioning module fuses the measurement data of the horizontal lidar and the measurement data of the IMU by using the filtering algorithm to obtain the horizontal position and the horizontal velocity. Based on the hovering horizontal position, the horizontal position and the horizontal velocity, the first flight parameter is obtained by PID cascade control and transmitted to the control module.

The control module acquires the measurement data of the to-ground laser ranging sensor, the to-air laser ranging sensor and the barometer, obtains the vertical altitude data according to the preset velocity threshold and sends it to the vertical altitude pinpointing module, which uses the filtering algorithm to fuse the vertical altitude data with the IMU measurement data to obtain the vertical altitude and vertical velocity, and obtains the second flight parameter through PID cascade control based on the hovering height, vertical altitude and vertical velocity and transmits them to the control module.

The control module controls the flight of the multi-rotor UAV based on the first flight parameter and the second flight parameter.

The preferred embodiments of the present invention have been described in detail above. It should be understood that those skilled in the field can make many modifications and changes according to the concept of the present invention without creative efforts. Therefore, all technical schemes that can be obtained by the technicians in the technical field through logical analysis, reasoning or limited experiments based on the existing technology according to the concept of the present invention should be within the scope of protection determined by the claims.

Figure 7:
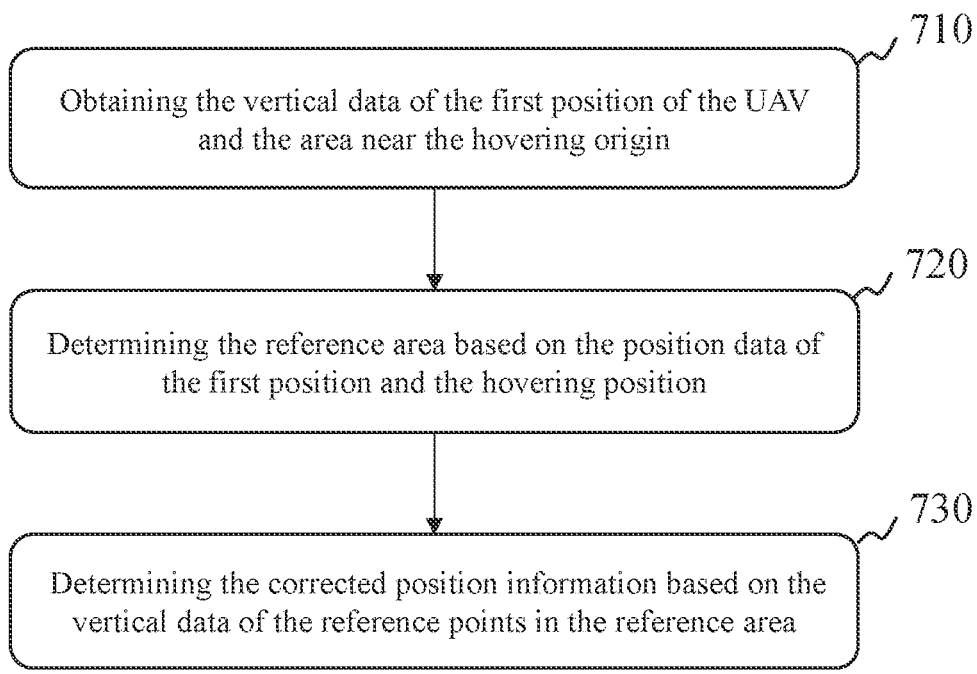
FIG. 7 is an exemplary flowchart of correcting position information according to some embodiments of this present disclosure.

FIG. 7 is an exemplary flowchart of correcting position information according to some embodiments of this present disclosure. The process 700 includes 710, 720 and 730. The process 700 is executed by the control module.

In some embodiments, the position information of the UAV is corrected and determined based on a first position, which is determined based on the measurement data of the IMU. In some embodiments, the correction includes determining a reference area based on the first position, and determining the position information based on the vertical distance of the first position and the vertical data of reference points in the reference area. In the embodiment described in FIG. 7 of this present disclosure, the UAV passes through the hovering position by default, and the hovering position is taken as the origin (also called the hovering origin).

710, Obtaining the vertical data of the first position of the UAV and the area near the hovering origin.

The first position refers to the current position where the UAV is temporarily located, which is the position to be corrected. The vertical data of the first position can be measured by IMU of UAV (real-time rough positioning of IMU).

In some embodiments, the vertical data of the area near the hovering origin includes the vertical coordinates of the tunnel top (also referred to as top of the tunnel) (tunnel top coordinates) and the vertical coordinates of the tunnel bottom(also referred to as bottom of the tunnel) (tunnel bottom coordinates) corresponding to several points in the area near the hovering origin. In some embodiments, the vertical data of the area near the hovering origin also includes the vertical distance from the tunnel top to the tunnel bottom.

In some embodiments, the vertical data of the area near the hovering origin can be obtained according to the known information of the tunnel. For example, by obtaining the structural information of the tunnel under construction, the vertical data of the hovering origin and area near the hovering origin can be obtained according to the vertical data in the structural information.

In some embodiments, the vertical data of the area near the hovering origin also can be acquired by UAV' s movement. For example, the UAV can move from the hovering origin to different positions near the hovering origin. In the process of moving, the relative distance between the UAV and the top and bottom of the tunnel is measured by lidar, and the current position, the coordinates of the top of the tunnel and the coordinates of the bottom of the tunnel are determined by IMU measurement data.

In some embodiments, the vertical data of the area near the hovering origin of the UAV can also be obtained according to the known information of the tunnel or other ways.

720, Determining the reference area based on the position data of the first position and the hovering position.

The reference area refers to the area composed of several points relative to the area near the hovering position. The reference area can reflect the possible error range of IMU, which is used for the subsequent correction of position information.

In some embodiments, the reference area is determined based on the first position and hovering position of the drone. The range of the reference area is positively correlated with the horizontal distance between the first position and the hovering position. The reference area can be a circular area with a certain radius with the first position as the center of the circle. In some embodiments, the radius can be adjusted according to the distance between the first position and the hovering position. For example, the larger the distance between the first position and the hovering position, the larger the radius of the circular area.

In some embodiments, the reference area can also be determined based on the first position of the UAV and the position of the last correction. The reference area can be a circular area with a certain radius with the first position as the center of the circle. In some embodiments, the radius of the circular area can be adjusted according to the length of time from the last calibration. For example, the longer the time from the last calibration, the larger the radius of the circular area may be.

The reference point is selected from the points whose plane coordinates fall in the reference area. For example, if the reference area is a circle, the reference point is a point in the plane area where the circle is located.

The vertical data of the reference point is determined by the UAV moving to the reference area after reaching the hovering position. For example, the UAV moves to a certain reference point P in the reference area after reaching the hovering position, and the vertical data determined when the AVU is located at the reference point P is the vertical data corresponding to the UAV.

730, Determining the corrected position information based on the vertical data of the reference points in the reference area.

In some embodiments, for the distance Di from the top to the bottom of the tunnel corresponding to each reference point, the current position also has a distance C from the top to the bottom. Based on C, the nearest Di nearby is found, and the position of the reference point corresponding to Di is taken as the corrected current position.

In some embodiments of this present disclosure, the vertical data of the reference point is obtained by the UAV from the hovering position by using IMU for a short time. The IMU navigation information used to determine the vertical data of the reference point takes a short time, and the accumulated error is relatively small, which is conducive to ensuring the accuracy and validity of the data.

In some embodiments, the method for determining the corrected position information may include the following steps:

(1) determining the reference points in the reference area;

(2) based on all reference points, calculating the distance between the corresponding top and bottom, wherein the distance between the corresponding top and bottom of each available reference point is determined based on the coordinates of the top and bottom of the tunnel determined in 710;

(3) determining the distance between the top and bottom corresponding to the current position of the UAV, wherein the distance between the current position of the UAV and the top of the tunnel and the distance between the current position of the UAV and bottom of the tunnel are determined based on the vertical to-ground and to-air laser ranging sensors, and addition operation on them is carried out;

(4) based on the distance between the top and bottom of the tunnel corresponding to the real-time position of the UAV and the distances between the top and bottom corresponding to a plurality of reference points, determining the optimal reference points by matching calculation, wherein the matching calculation can be to calculate the difference between the distances between the top and bottom of the tunnel corresponding to the current position of the UAV and the distances between the top and bottom corresponding to each reference point respectively; and (5) taking the best reference point as the new positioning point of the UAV (determining the corrected positioning information).

In some embodiments of this specification, the current position is corrected by delimiting the reference area, which is beneficial to avoid the problem of inaccurate IMU positioning, overcome the positioning problem caused by the uneven top and bottom of the tunnel, and contribute to the accurate positioning of the UAV.

It should be noted that the above description of the flow is only for example and description, and does not limit the scope of application of this present disclosure. For those skilled in the art, various modifications and changes can be made to the process under the guidance of this present disclosure. However, these modifications and changes are still within the scope of this present disclosure.

Figure 8:
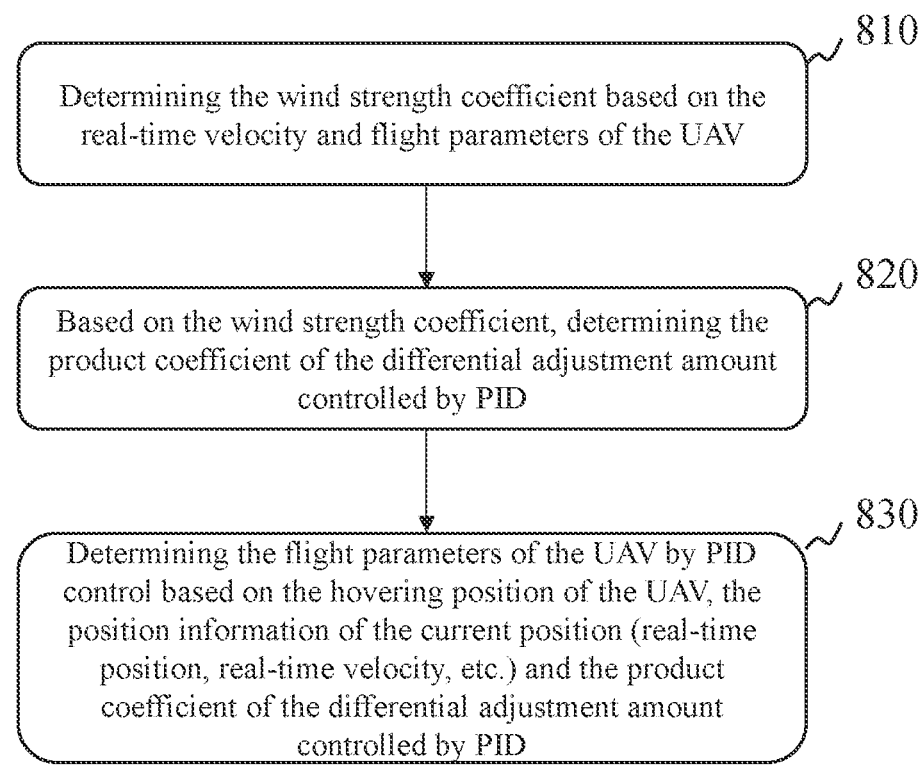
FIG. 8 is an exemplary flow chart for determining flight parameters through proportion integration differentiation (PID) control according to some embodiments of this present disclosure.

FIG. 8 is an exemplary flow chart for determining flight parameters through PID control according to some embodiments of this present disclosure. The process 800 includes 810, 820 and 830. The flow 800 is executed by the control module.

810, Determining the wind strength coefficient based on the real-time velocity and flight parameters of the UAV.

The wind strength coefficient can be the wind strength value and wind direction (also called wind direction) of the past several time points. For example, the several time points can be a series of time points separated by 1 second. A wind strength value can be determined by the flight velocity and flight parameters (throttle and attitude, etc.) of the UAV.

In some embodiments, the difference between the real-time velocity of the UAV affected by the airflow and the corresponding velocity of the flight parameters corresponds to the real-time wind strength value and the corresponding wind direction of the airflow. For example, the real-time rising velocity of UAV affected by updraft is faster than the corresponding velocity of flight parameters . For example, the real-time horizontal velocity and flight parameters of the UAV affected by the horizontal forward airflow are faster.

820, Based on the wind strength coefficient, determining the product coefficient of the differential adjustment amount controlled by PID. The differential adjustment of PID control is negatively correlated with the wind strength coefficient, and the product coefficient of the differential adjustment of PID control can be used for PID control.

Figure 9:
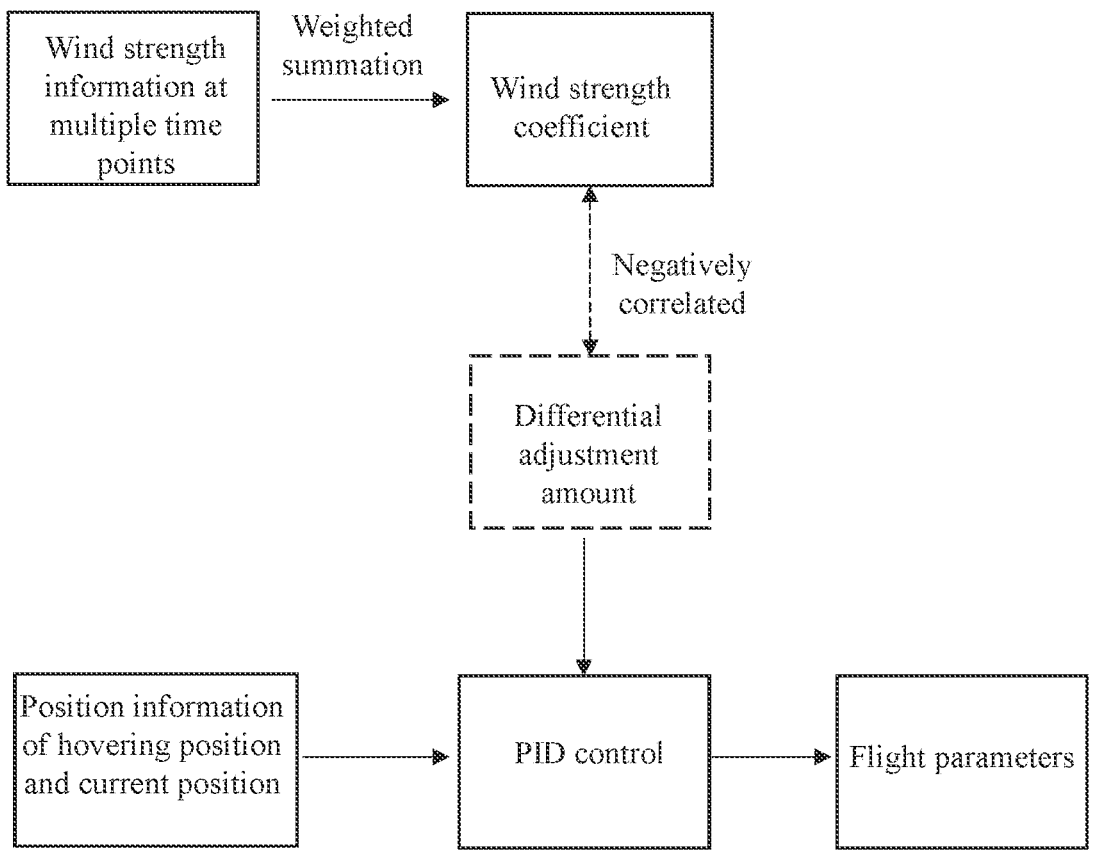
FIG. 9 is an exemplary block diagram of determining flight parameters through PID control according to some embodiments of this present disclosure.

As shown in FIG. 9, the wind strength coefficient is determined based on wind strength information at a plurality of time points. The wind strength information can be the wind strength value at a certain point in time and its wind direction. The wind strength information is determined based on the measurement data of IMU.

In some embodiments, the wind strength information at multiple time points determined by IMU measurement data is weighted sum, and the weighted sum result is taken as the wind strength coefficient. In some embodiments, the weighted summation process of wind strength information involves independent summation calculation of different coefficients. For example, the weighted summation process of wind strength information involves weighted summation between wind strength values at multiple time points and weighted summation between wind directions. Among them, the weight value corresponding to each wind strength information can be different, which can be adjusted according to the distance between the time corresponding to the wind strength information and the current time, and the closer the time, the greater the weight corresponding to the wind strength information.

In some embodiments, based on the determined wind strength coefficient, the product coefficient of the differential adjustment amount controlled by PID is determined by the correlation between the wind strength coefficient and the differential adjustment amount controlled by PID. The product coefficient of the differential adjustment amount controlled by PID can be obtained based on mathematical methods or models.

830, Determining the flight parameters of the UAV by PID control based on the hovering position of the UAV, the position information of the current position (real-time position, real-time velocity, etc.) and the product coefficient of the differential adjustment amount controlled by PID.

As shown in FIG. 9, flight parameters are generated by PID control based on the position information of the hovering position and current position (including hovering position, real-time position and real-time velocity) and the differential adjustment amount. For the related contents of PID control, please refer to the corresponding descriptions in FIGS. 2 to 6 of this present disclosure.

In some embodiments, when the wind strength in the same direction as the traveling direction of the UAV is large, the product coefficient of the differential adjustment amount controlled by PID is small, and the control strength of the flight parameters of the UAV is small.

In some embodiments of this present disclosure, the control signal is determined by PID, which reduces the response of PID control to the velocity change when the wind is strong, thus avoiding the attitude change of the UAV excessively, which is conducive to improving the intelligence of the UAV motion control.

The basic concepts have been described above. Obviously, for those skilled in the art, the above detailed description is only an example and does not constitute a limitation of this present disclosure. Although not explicitly stated here, those skilled in the field may make various modifications, improvements and amendments to this present disclosure. Such modifications, improvements and corrections are suggested in this present disclosure, so such modifications, improvements and corrections still belong to the spirit and scope of the exemplary embodiments of this present disclosure.

Meanwhile, this present disclosure uses specific words to describe the embodiments of this present disclosure. Such as "an embodiment", "one embodiment" and/or "some embodiments" mean a certain feature, structure or characteristic related to at least one embodiment of this present disclosure. Therefore, it should be emphasized and noted that "one embodiment" or "an embodiment" or "an alternative embodiment" mentioned two or more times in different positions in this present disclosure do not necessarily refer to the same embodiment. In addition, some features, structures or characteristics in one or more embodiments of this present disclosure may be combined as appropriate.

In addition, unless explicitly stated in the claims, the order of processing elements and sequences, the use of numerals and letters, or the use of other names described in this present disclosure are not used to limit the order of processes and methods in this present disclosure. Although some currently considered useful embodiments of the invention are discussed through various examples in the above disclosure, it should be understood that such details are only for the purpose of illustration, and the appended claims are not limited to the disclosed embodiments. On the contrary, the claims are intended to cover all modifications and equivalent combinations that meet the spirit and scope of the embodiments of this present disclosure. For example, although the system components described above can be realized by hardware devices, they can also be realized only by software solutions, such as installing the described system on existing servers or mobile devices.

Similarly, it should be noted that in order to simplify the expression disclosed in this present disclosure and help to understand one or more embodiments of the invention, in the previous description of embodiments of this present disclosure, various features are sometimes combined into one embodiment, drawings or description thereof. However, this method of disclosure does not mean that the object of this present disclosure needs more features than those mentioned in the claims. In fact, the features of the embodiment are less than all the features of the single embodiment disclosed above.

In some examples, numbers describing the number of components and attributes are used. It should be understood that such numbers used in the description of examples are modified by the modifiers "about", "approximately" or "substantially" in some examples. Unless otherwise stated, "about", "approximate" or "substantially" indicate that the number allows a change of plus or minus 20%. Accordingly, in some embodiments, the numerical parameters used in the present disclosure and claims are approximate values, which can be changed according to the required characteristics of individual embodiments. In some embodiments, numerical parameters should consider the specified significant digits and adopt the method of general digit retention. Although in some embodiments of this present disclosure, the numerical fields and parameters used to confirm the range and breadth are approximate values, in specific embodiments, the setting of such numerical values is as accurate as possible within the feasible range.

For every patent, patent application, patent application publication and other materials cited in this present disclosure, such as articles, books, manuals, publications, documents, etc., the entire contents are hereby incorporated into this present disclosure by reference. Except for the application history documents that are inconsistent with or conflict with the contents of this present disclosure, and the documents that limit the widest scope of claims in this present disclosure (currently or later attached to this present disclosure). It should be noted that if there is any inconsistency or conflict between the descriptions, definitions and/or terms in the attached materials of this present disclosure and the contents of this present disclosure, the descriptions, definitions and/or terms in this present disclosure shall prevail.

Finally, it should be understood that the examples described in this present disclosure are only used to illustrate the principles of the embodiments in this present disclosure. Other variations of may also fall within the scope of this present disclosure. Therefore, by way of example and not limitation, alternative configurations of embodiments of this present disclosure can be regarded as consistent with the instructions of this present disclosure. Accordingly, the embodiments of this present disclosure are not limited to those explicitly introduced and described in this present disclosure.

What is claimed is:

1. A method for hovering control of an unmanned aerial vehicle (UAV) in a tunnel, comprising:
   acquiring hovering information of a hovering position of the UAV;
   acquiring position information of a current position of the UAV; and
   determining flight parameters based on the hovering information and the position information, wherein the flight parameters are used to control the UAV to move from the current position to the hovering position, wherein
   the UAV comprises a controller, a horizontal lidar, a to-ground laser ranging sensor, a to-air laser ranging sensor, an inertial measurement unit (IMU), and a barometer, wherein
   the acquiring the hovering information includes:
      acquiring the hovering information based on measurement data obtained by the horizontal lidar, the to-ground laser ranging sensor, the to-air laser ranging sensor, the IMU and the barometer, the hovering information including a hovering horizontal position and a hovering height, the position information including a horizontal position, a horizontal velocity, a vertical altitude, and a vertical velocity, and
   the acquiring the position information includes:
      fusing the measurement data of the horizontal lidar with the measurement data of the IMU by using a filtering algorithm to obtain the horizontal position and the horizontal velocity;
      based on the horizontal velocity and a preset velocity threshold, obtaining vertical altitude data from measurement data of one of the to-ground laser ranging sensor, the to-air laser ranging sensor and the barometer, including:
         in response to the horizontal velocity is greater than or equal to the preset velocity threshold, obtaining the vertical altitude data based on the measurement data of the barometer; and
         in response to the horizontal velocity is less than the preset velocity threshold and tunnel ground is within a measuring range of the to-ground laser ranging sensor, obtaining the vertical altitude data based on the measuring data of the to-ground laser ranging sensor; and
         in response to the horizontal velocity is less than the preset velocity threshold, the tunnel ground is not within the measuring range of the to-ground laser ranging sensor, and a tunnel top surface is within the measuring range of the to-air laser ranging sensor, obtaining the vertical altitude data based on the measuring data of the to-air laser ranging sensor; and in response to the horizontal velocity is less than the preset velocity threshold, and the tunnel ground and the tunnel top surface are not within the measurement range of the to-ground laser ranging sensor and the to-air laser ranging sensor, obtaining the vertical altitude data based on the measurement data of the barometer;

fusing the vertical altitude data with the IMU measurement data by using the filtering algorithm to obtain the vertical altitude and the vertical velocity;

determining flight parameters based on the hovering information and the position information comprises:

obtaining a first flight parameter based on the hovering horizontal position, the horizontal position and the horizontal velocity; and obtaining a second flight parameter based on the hovering height, the vertical altitude and the vertical velocity; wherein the controller controls the UAV to move from the current position to the hovering position based on the first flight parameter and the second flight parameter.

2. The method of claim 1, wherein move from the current position to the hovering position comprises determining the flight parameters through a PID control based on the current position and the position information.

3. The method of claim 2, wherein a differential adjustment amount of the PID control is negatively correlated with a wind strength coefficient.

4. The method of claim 3, wherein the wind strength coefficient is determined based on wind strength information at a plurality of time points, and the wind strength information is determined based on the measurement data of the IMU.

5. The method of claim 4, wherein the wind strength coefficient is a weighted sum of the wind strength information at the plurality of time points, and a weight corresponding to wind strength information far from a current time point is smaller.

6. The method of claim 3, wherein the wind strength coefficient includes wind strength values and wind directions of past several time points, and the wind strength values are determined by a flight velocity and reference flight parameters of a reference UAV.

7. A non-transitory computer-readable storage medium storing computer instructions, when reading the computer instructions in the storage medium, the computer executing the method according to claim 1.

8. The method of claim 1, wherein fusing the measurement data of the horizontal lidar with the measurement data of the IMU by using a filtering algorithm comprises:

fusing the measurement data of the horizontal lidar with the measurement data of the IMU by using an extended Kalman filtering algorithm.

9. The method of claim 1, wherein fusing the vertical altitude data with the IMU measurement data by using the filtering algorithm comprises:

fusing the vertical altitude data with the measurement data of the IMU by using an extended Kalman filtering algorithm.

10. The method of claim 1, wherein obtaining the first flight parameter based on the hovering horizontal position, the horizontal position and the horizontal velocity comprises:

obtaining the first flight parameter through a proportion integration differentiation (PID) cascade control based on the hovering horizontal position, the horizontal position and the horizontal velocity; the PID cascade control includes an outer loop control and an inner loop control, wherein the outer loop control is a horizontal position loop, a target horizontal velocity is obtained according to the hovering horizontal position and the horizontal position, and the inner loop control is a velocity loop, and the first flight parameter is obtained according to the target horizontal velocity and the horizontal velocity.

11. The method of claim 10, wherein the first flight parameter is an attitude signal of a UAV body.

12. The method of claim 1, wherein obtaining the second flight parameter based on the hovering height, the vertical altitude and the vertical velocity comprises:

based on the hovering height, the vertical altitude and the vertical velocity, obtaining the second flight parameter through a PID cascade control; the PID cascade control includes an outer loop control and an inner loop control, wherein the outer loop control is a vertical altitude loop, a target vertical velocity is obtained according to the hovering height and the vertical altitude, and the inner loop control is a velocity loop, and the second flight parameter is obtained according to the target vertical velocity and the vertical velocity.

13. The method of claim 1, wherein the second flight parameter is a throttle signal.

14. A system for hovering control of a UAV in a tunnel, comprising:

at least one storage medium including a set of instructions; and at least one processor in communication with the at least one storage medium, wherein when executing the instructions, the at least one processor is configured to direct the system to perform operations including:

acquiring hovering information of a hovering position of the UAV;

acquiring position information of a current position of the UAV; and determining flight parameters based on the hovering information and the position information, wherein the flight parameters are used to control the UAV to move from the current position to the hovering position, wherein the position information is determined based on a first position, and the first position is determined based on measurement data of an inertial measurement unit acquired when the UAV is at the current position;

the position information is determined by determining a reference area based on the first position, and determining the position information based on a vertical distance of the first position and vertical data of reference points in the reference area; wherein the vertical data of the reference points includes vertical coordinates of a tunnel top located at a tunnel top and vertical coordinates of a tunnel bottom corresponding to the reference points and a vertical distance from the tunnel top to the tunnel bottom; wherein determining the position information based on a vertical distance of the first position and vertical data of reference points in the reference area includes:

for each reference points, determining a distance between the tunnel top and the tunnel bottom based on the vertical data of the reference points;

determining a distance between the tunnel top and the tunnel bottom corresponding to the current position of the UAV based on a vertical to-ground sensor and a to-air laser ranging sensor;

determining an optimal reference point by determining a difference between the distance between the tunnel top and tunnel bottom corresponding to the current position of the UAV and the distance between the tunnel top and the tunnel top corresponding to each of the reference points; and taking a position of the optimal reference point as the position information.

15. The system of claim 14, wherein a range of the reference area is positively correlated with a horizontal distance between the first position and the hovering position.

16. The system of claim 14, wherein the reference area refers to an area near the hovering position, and the reference area is a circular area with a certain radius with the first position as a center of a circle.

* * * * *